United States Patent [19]

Iwatsuka et al.

[11] Patent Number: 5,245,471

[45] Date of Patent: Sep. 14, 1993

[54] POLARIZERS, POLARIZER-EQUIPPED OPTICAL ELEMENTS, AND METHOD OF MANUFACTURING THE SAME

[75] Inventors: Shinji Iwatsuka; Naoki Hanashima; Yoshikazu Narumiya, all of Tokyo, Japan

[73] Assignee: TDK Corporation, Tokyo, Japan

[21] Appl. No.: 891,518

[22] Filed: Jun. 1, 1992

[30] Foreign Application Priority Data

Jun. 14, 1991 [JP] Japan ............................ 3-169035
Feb. 10, 1992 [JP] Japan ............................. 4-56536
May 18, 1992 [JP] Japan ........................... 4-148951

[51] Int. Cl.$^5$ .......................... G02B 5/18; G02B 5/30; B05D 5/06
[52] U.S. Cl. .................................. 359/494; 359/495; 359/566; 359/576; 427/163
[58] Field of Search ............... 359/484, 486, 494, 495, 359/496, 566, 569, 576, 500; 385/11; 427/163, 164, 166

[56] References Cited

U.S. PATENT DOCUMENTS

| | | | |
|---|---|---|---|
| 4,657,350 | 4/1987 | Mori | 427/163 |
| 4,778,234 | 10/1988 | Papuchon et al. | 385/11 |
| 4,991,937 | 2/1991 | Urino | 359/566 |
| 5,029,988 | 7/1991 | Urino | 359/566 |

FOREIGN PATENT DOCUMENTS

3-31803  2/1991  Japan ........................... 359/487

*Primary Examiner*—Martin Lerner
*Attorney, Agent, or Firm*—Seidel, Gonda, Lavorgna & Monaco

[57] ABSTRACT

A polarizer and a method of manufacturing the polarizer comprising first zones which are formed by one or more layers and second zones which are formed by one or more layers, the zones being alternately and horizontally arranged on a common plane. A material of at least one layer of at least either zones is birefringent, and the birefringent layer is formed by oblique vapor deposition. The polarizer, excellently suited for quantity production and for space and size reduction, can be formed directly and simply on the planes of light beam incidence or emergence of various optical elements. The invention also concerns polarizer-equipped optical elements and a method of manufacturing such elements which have the polarizer directly formed by oblique deposition on the plane of light beam incidence, emergence, or reflection of the optical elements.

17 Claims, 4 Drawing Sheets

POLARIZERS, POLARIZER-EQUIPPED OPTICAL ELEMENTS, AND METHOD OF MANUFACTURING THE SAME

BACKGROUND OF THE INVENTION

The present invention relates to novel polarizers more advantageously suited for quantity production than conventional polarizers and a method of manufacturing the same. More particularly, the invention relates to novel polarizers that can be easily formed on various optical elements by the oblique vapor deposition technique and a method of manufacturing the same. The invention relates also to various optical elements, such as optical isolators, equipped with the polarizers of the invention by oblique deposition, and a method of manufacturing the same.

Polarizers known in the art include dichroic polarizers, more commonly termed Polaroid plates, and birefringent polarizers. The former type, with limited extinction ratios, can hardly be used in precise measurements such as the determination of magneto-optical effects. The latter has the disadvantages of high material cost and difficulties involved in the manufacture, because a birefringent material, e.g., quartz, calcite, or magnesium fluoride, must be cut off at given angles to the axis of crystal into a prism or the like. When such polarizers are to be used in optical devices such as optical isolators, circulators, modulators, or switches, the polarizers and other component parts, e.g., Faraday rotators, must be fabricated separately. Combining and assembling these discrete elements renders it difficult to reduce the sizes of the end products. For example, conventional optical isolators require that a Faraday element be sandwiched between a pair of polarizers with their axes of transmission inclined at 45° to each other, the polarizers themselves being such expensive elements as polarization prisms.

Recently a polarizer of the diffraction grating type made from $LiNbO_3$ by proton exchange was introduced as a polarization element utilizing the diffraction phenomena (Japanese Patent Application Public Disclosure No. 63-55501). The polarizer is thin and suited for mass production, but it must use a high-priced monocrystalline substrate of $LiNbO_3$. In addition, like the other polarizers of the prior art, it has to be fabricated independently of the optical elements to be assembled together and therefore is unable to make for the overall size reduction of the resulting optical device. Also known in the prior art is an optical isolator which is a Faraday rotator imparted with the functions of a polarizer by the formation of phase grating at a finer pitch than a half of the wavelength of light on the rotator surface (Japanese Patent Application Public Disclosure No. 2-10311). The omission of a polarization prism favors its miniaturization. On the other hand, the need of forming extremely fine grooves on the Faraday rotator with good accuracy makes the isolator difficult to manufacture and unfit for commercial production.

It is an object of the present invention to provide novel polarizers which, unlike the existing polarizers, facilitate quantity processing and reduction of space requirements and, moreover, can be attached directly and simply to the planes of various optical elements for incidence or emergence of light rays.

Another object of the invention is to provide a variety of optical elements directly equipped with such polarizers and made smaller than usual.

Still another object of the invention is to provide a method of manufacturing those polarizers.

After intensive search for the way of realizing the above objects, the present inventors have now successfully developed polarizers that utilize the diffraction phenomena and are easy to manufacture and suited for quantity production by the formation of birefringent films in a grating pattern by so-called oblique deposition.

SUMMARY OF THE INVENTION

The invention thus resides in a polarizer comprising first zones which are formed by one or more layers and second zones which are formed by one or more layers, said first and second zones being arranged alternately and horizontally on a common plane so as to form a diffraction grating structure, said second zones having a different optical character from that of said first zones, the material of at least one layer of at least one of said zones being birefringent, said birefringent layer or layers being formed by oblique deposition.

The invention resides also in a polarizer comprising first zones which are formed by one or more layers and second zones which are formed by one or more layers, said first and second zones being arranged alternately and horizontally on a common plane so as to form a diffraction grating structure, said second zones having a different optical character from that of said first zones, the material of at least one layer of either zone being birefringent, said birefringent layer or layers being formed by oblique deposition, at least one layer of the other zone being formed of a filler.

The invention resides also in a polarizer comprising first zones which are formed by one or more layers and second zones which are formed by one or more layers, said first and second zones being arranged alternately and horizontally on a common plane so as to form a diffraction grating structure, said second zones having a different optical character from that of said first zones, the material of at least one layer of said first zones being birefringent, said birefringent layer or layers being formed by oblique deposition, an adhesive being filled up on said second zones till it covers the top surface of said first zones, and a substrate affixed to said adhesive layer.

The invention provides an optical element equipped with a polarizer, the polarizer being directly attached by oblique deposition to at least one plane of the optical element for incidence, emergence, or reflection of light rays.

The invention provides also magneto-optic components in which the above polarizer is formed on at least one plane of a magneto-optic element for incidence, emergence, or reflection of light rays.

The invention, in addition, provides optical switches and optical modulators in which the above polarizer of the invention is formed on at least one plane of an electro-optic element for incidence, emergence, or reflection of light rays.

In another aspect, the invention resides in a method of manufacturing a polarizer having a diffraction grating structure, which process comprises forming a birefringent film of a metallic oxide by vapor deposition on a substrate located obliquely with respect to the source of vapor deposition, depositing a masking material in a lattice pattern on the birefringent film, forming grooves in a lattice pattern in the birefringent film by etching, depositing an isotropic dielectric film on either the birefringent film or the substrate and also on the mask, and then removing the mask together with the dielectric film thereon.

In still another aspect, the invention resides in a method of manufacturing an optical element equipped with a polarizer having a diffraction grating structure deposited on at least one plane of the optical element for incidence or emergence of light rays, which process comprises forming a birefringent film of a metallic oxide by vapor deposition on at least one plane of the optical element for light incidence or emergence located obliquely with respect to the source of vapor deposition, depositing a masking material in a lattice pattern on the birefringent film, forming grooves in a lattice pattern in the birefringent film by etching, depositing an isotropic dielectric film on either the birefringent film or the substrate and also on the mask, and then removing the mask together with the dielectric film thereon.

In yet another aspect, the invention resides in a method of manufacturing a polarizer having a diffraction grating structure, which process comprises forming a birefringent film of a metallic oxide by vapor deposition on a substrate located obliquely with respect to the source of vapor deposition, depositing a masking material in a lattice pattern on the birefringent film, forming grooves in a lattice pattern in the birefringent film by etching, and, before or after the removal of the mask, filling up the grooves with a filler.

In a further aspect, the invention resides in a method of manufacturing an optical element equipped with a polarizer having a diffraction grating structure deposited on at least one plane of the optical element for incidence or emergence of light rays, which process comprises forming a birefringent film of a metallic oxide by vapor deposition on at least one plane of the optical element for light incidence or emergence located obliquely with respect to the source of vapor deposition, depositing a masking material in a lattice pattern on the birefringent film, forming grooves in a lattice pattern in the birefringent film by etching, and, before or after the removal of the mask, filling up the grooves with a filler.

DETAILED DESCRIPTION OF THE INVENTION

This invention, as stated above, resides in a polarizer that utilizes diffraction phenomena. In order to function as such, the polarizer is required to satisfy the following relations, assuming that the thickness of the individual layers of the first zone is $d_{1i}$; the number of the layers, $m_1$; the thickness of the individual layers of the second zone, $d_{2j}$; the number of the layers, $m_2$; the refractive indexes of materials of layers in the first zone relative to the polarized light components of incident rays orthogonal to each other, $n_{1i+}$, $n_{1i-}$; and the refractive indexes of the film materials of the layers in the second zone, $n_{2j+}$, $n_{2j-}$:

$$\sum_{i=1}^{m_1} n_{1i+} d_{1i} - \sum_{j=1}^{m_2} n_{2j+} d_{2j} - 1 \times (d_1 - d_2) = N_1 \lambda \quad (I)$$

$$\sum_{i=1}^{m_1} n_{1i-} d_{1i} - \sum_{j=1}^{m_2} n_{2j-} d_{2j} - 1 \times (d_1 - d_2) = (N_2 + \tfrac{1}{2})\lambda \quad (II)$$

in which $N_1$, $N_2$ are given integers, $\lambda$ is the wavelength of the light beam, $d_1$ is the thickness of the first zone $$\left( d_1 = \sum_{i=1}^{m_1} d_{1i} \right),$$

and $d_2$ is the thickness of the second zone $$\left( d_2 = \sum_{j=1}^{m_2} d_{2i} \right).$$

When these relations are satisfied, the incident-ray polarized light components indicating refractive indexes $n_{1+}$, $n_{2+}$ interfere with each other for intensification as they pass through the polarizer, whereas the incident-ray polarized light components indicating refractive indexes $n_{1-}$, $n_{2-}$ weaken each other by mutual interference as they pass through the polarizer. In the end, only the polarized light components in the + direction can be taken out.

Figure 1:
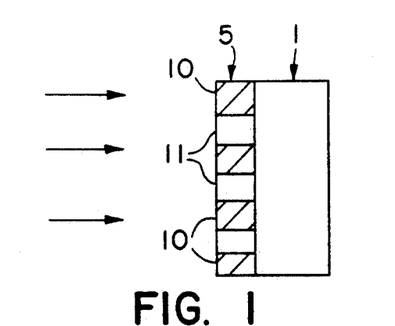
FIG. 1 shows an embodiment of a polarizer or a Faraday rotator equipped with the polarizer according to the invention.

The polarizer of the invention will now be described with reference to the accompanying drawings. In FIG. 1 is illustrated an embodiment of the polarizer of the invention as comprising a glass substrate 1 and a laminate formed on a light-incident plane of the substrate. The laminate 5 consists of zones 10 of the first film material and zones 11 of the second film material formed in an alternate pattern. Shown here is the simplest of the embodiments of the invention in that, in the above formulas (I) and (II), $m_1 = m_2 = 1$ and $d_1 = d_2$. The film material of the zones 10 is birefringent while that of the zones 11 is isotropic. Let the refractive indexes of the birefringent film material of the zones 10 be $n_{1+}$, $n_{1-}$ and the refractive index of the isotropic material of the zones 11 be $n_2$. Then, the use of a material that will satisfy the formulas (III) and (IV) both of which are derived from the formula (I), $$(n_{1+} - n_2) d = N_1 \lambda \quad (III)$$

$$(n_{1-} - n_2)d = (N_2 + \tfrac{1}{2}) \qquad \text{(IV)}$$

in which $N_1$, $N_2$ are given integers, $\lambda$ is the wavelength of the light beam, and d is the thickness of the film material, will enable the incident-ray polarized light component indicating the refractive index $n_{1+}$ to interfere with the beam of light that passes through the zones 11 for mutual intensification. In the meantime the incident-ray polarized light component indicating the refractive index $n_{1-}$ interferes with the beam of light passing through the zones 11 to weaken each other. Thus, only the polarized light component indicating the refractive index $n_{1+}$ enters the glass substrate 1. In order that these interference conditions may be satisfied, it is necessary in general that the area of the zones 10 be substantially equal to that of the zones 11 within the range through which light beams are transmitted.

If in FIG. 1 the substrate 1 is replaced by a Faraday rotator and the zones 10 and 11 are formed on the latter, an optical isolator can be made. In that case, the optical isolator will function as such when a polarization prism or other polarizer is provided on the side where the beam of light emerges or when the laminate 5 is also formed on the emergence side of a Faraday rotator. In either case, the polarizer or laminate to be provided or formed on the emergence side should be in an optical arrangement such that it transmits only the polarized light component deviating 45° from the polarized component of the light that passes through the laminate on the incidence side.

The birefringent material to be used under the present invention is one that can be formed into a film by oblique deposition, e.g., $Ta_2O_5$, $WO_3$, $Bi_2O_3$, or ZnS. Useful materials are not limited to these but may be varied provided they are made birefringent by oblique deposition. Among the materials to form the zone layers other than birefringent ones; isotropic materials, e.g., $SiO_2$, $TiO_2$, $Y_2O_3$, $MgF_2$, or $ZrO_2$, may be employed as well to impart reflection-preventive, phase-adjusting and other functions to polarizers or various other optical elements. These isotropic materials can be fabricated by ordinary vapor deposition, sputtering, etc.

The method of the invention for manufacturing a polarizer or the like by forming a birefringent film with zones 10 of the first film material and zones 11 of the second film material in an alternate and horizontal arrangement on at least either plane of light incidence or emergence of an optical element which may vary from a glass substrate to a Faraday rotator as mentioned above will now be explained in detail. For the manufacture of a polarizer, e.g., a process as illustrated sequentially in FIG. 2 may be used. First, as shown at (A), a glass substrate 1 is furnished and formed with a birefringent film 2 on its side of light incidence or emergence by oblique deposition. By "oblique deposition" is meant a technique for vapor deposition of an inorganic material, such as a metallic oxide, onto a substrate in the direction oblique to the latter. The vapor-deposited film formed in this way has a fibrous columnar structure tilted with respect to the substrate, or an anisotropic structure, which gives rise to a difference between the refractive index relative to the linearly polarized light in the tilted direction and the refractive index relative to the linearly polarized light in the orthogonal direction. Consequently, the vapor deposited film thus formed becomes birefringent. For this method an ordinary vacuum equipment, e.g., a vacuum deposition apparatus that relies on electron beam heating may be used. A substrate is placed obliquely in such apparatus for subjection to vapor deposition. Such a process is discussed in detail, e.g., in T. Motohiro and Y. Taga: Applied Optics, Vol. 28, No. 13, pp. 2466-2482 (1989). Reference to the above paper shall form a part of the description herein. The process can form, e.g., a $Ta_2O_5$ or other metallic oxide film of a bilayered structure. The angle of deposition is preferably around 70° where the birefringence is maximized. A $Ta_2O_5$ film deposited obliquely at 70° has a birefringence index of approximately 0.06. The use of oblique deposition permits polarizers to be formed over a very broad range of substrates, from glass plates to substrates of magneto-optic and electro-optic elements. Thus, the invention may employ many different substrates, without being confined to specific substrate materials as taught by the prior art, such as Patent Application Public Disclosure Nos. 2-10311 and 63-55501.

Figure 2A:
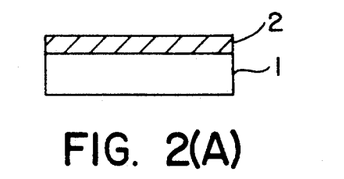
FIGS. 2(A) to 2(E) shows in a sequence of steps the process of producing a polarizer or a Faraday rotator equipped with the polarizer according to the invention.
Figure 2B:
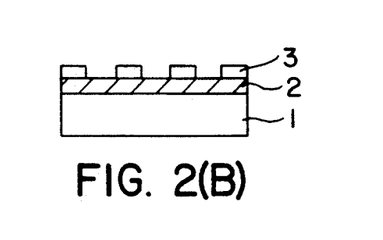
Figure 2C:
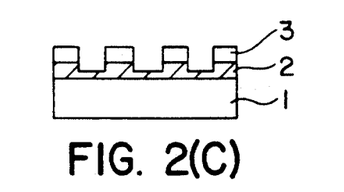

Next, a striped mask as shown at (B) is formed by photolithography or other suitable technique on the birefringent film of $Ta_2O_5$ or the like already formed in the foregoing manner. The periodicity of the masked gratings may, e.g., be about 100 $\mu$m. Then, as at (C), the unmasked areas of the $Ta_2O_5$ film are etched deeply enough to form grooves. The $Ta_2O_5$ film 2, shown slightly left behind, may be completely removed instead.

Figure 2D:
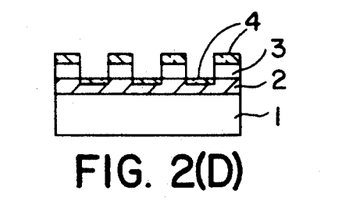
Figure 2E:
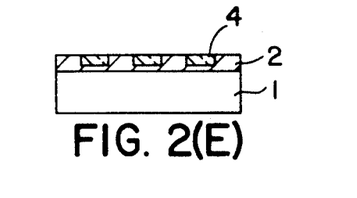

In the step that follows, an isotropic dielectric film 4 is formed by vapor deposition or sputtering over the mask and the $Ta_2O_5$ film 2, producing a laminated structure as (D). This dielectric film may be made of a material differing in birefringence from the above birefringent material. Then, as (E) shows, the mask is dissolved together with the isotropic dielectric film formed thereon by the action of a solvent. Alternatively, the vapor deposition of the film 4 may be replaced by filling of an isotropic material in the grooves formed by etching. In the latter case the mask may be removed either before or after the filling with the filler. The filler may be any of various light-transmissive materials or an adhesive. A polarizer of the invention is thus obtained.

In another aspect of the invention, a polarizer having an adhesive layer can be made by replacing the step (C) and ensuing steps by those shown in FIG. 6. Referring now to FIG. 6, etching is done as at (C) following the steps (A) and (B) of FIG. 2. The etching may leave a part of the birefringent layer behind. After the mask 3 has been removed by the action of a solvent or the like as at (D), an adhesive 18 is filled in the grooves formed by the etching. Desirably, the adhesive is supplied until it covers the obliquely deposited layer as shown at (E). The adhesive may be supplied, for example, in the following manner. Turning to FIG. 6(D), an adequate amount of the adhesive is applied to the substrate 1 and film 4, and the other substrate 19 is placed under some pressure upon the adhesive layer as at (E). Any excess of the adhesive will flow out of the sandwich. Then, the adhesive is hardened by application of heat if the adhesive used is of a thermosetting type or by ultraviolet irradiation if the adhesive is of an ultraviolet curing type. The adhesive to be used for this purpose may be any of transparent resins including thermosetting and ultraviolet-curing resins. Then, as (D) shows, the adhesive layer 18 is covered with a transparent substrate 19. Like the base substrate 1, this substrate 19 may be a glass plate, magneto-optic or electro-optic element or the like.

The polarizer of the filler-filled type, in which the spaces between the lattices are closely filled up with a filler, is advantageous over the type which has a vapor-deposited dielectric film. It is easier to manufacture and handle, and the further advantage is greater reliability of the polarizer than the polarizer with exposed lattices.

The polarizer thus fabricated, based on the glass substrate, can be used directly as a discrete polarizer. When manufacturing an optical isolator, a Faraday rotator having a rotational angle of 45° is employed in place of the glass substrate at the step (A). In that case a similar film may be laminated in a similar way on the side opposite to the plane of light beam incidence, or an additional polarizer, such as a polarization prism, may be disposed on that side to make up an optical isolator.

Figure 3:
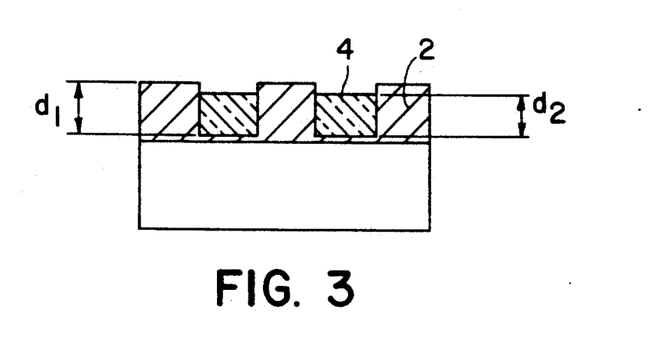
FIG. 3 shows another embodiment of a polarizer or a Faraday rotator equipped with the polarizer according to the invention.

Another form of the laminate produced by the above process may have the first and second zones of different film thicknesses $d_1$, $d_2$, as shown in FIG. 3. For example, when in the formulas (I) and (II) $m_1=1$, $m_2=1$, and $d_1 \neq d_2$, the following relations should hold:

$$n_{1+}d_1 - [n_2 d_2 + 1 \times (d_1 - d_2)] = N_1 \lambda$$

$$n_{1-}d_1 - [n_2 d_2 + 1 \times (d_1 - d_2)] = (N_2 + \tfrac{1}{2})\lambda$$

in which $n_{1+}$, $n_{1-}$ are the refractive indexes of the birefringent film 2, $n_2$ is the refractive index of the isotropic film 4, $N_1$ and $N_2$ are given integers, $d_1$ is the thickness of the birefringent film 2 formed by oblique deposition, $d_2$ is the thickness of the isotropic film, and $\lambda$ is the wavelength of the incident light beam.

For the better understanding of the polarizer according to the invention, an embodiment having the first and second zones both of a single layer has thus far been explained. In practical applications it is beneficial that the zones are formed of two or more layers, as will be described below in connection with other embodiments of the invention. This is because a polarizer of practical value must have an antireflective film so as to reduce the reflection loss. The numbers of layers for the first and second zones may be the same or different.

Another embodiment of the polarizer having two or more layers for each zone and a method of manufacturing it in accordance with the invention are illustrated in FIG. 7. Shown here is a modification of the polarizer of the above-described type filled with an adhesive. FIG. 7 (E) shows a polarizer comprising a substrate 1, obliquely deposited film 4, adhesive layer 18, another substrate 19, and vapor-deposited films 20, 21 which combinedly serve as an antireflective film to reduce the light of reflection that comes from the interfaces among the above component materials due to the differences of their refractive indexes. The film 20 serves also to protect the substrate against etching. Such a polarizer can be made following the sequence of steps (A) to (E) in FIG. 7. First, the vapor-deposited films 20 and 21 are formed on the substrate 1, and the obliquely deposited film 4 is formed by oblique deposition. Next, as shown at (B), a masking material is deposited in a lattice pattern on the surface and is etched so that the unmasked portions are removed to form grooves bottomed by the vapor-deposited film 21 (D). The term "lattice pattern" as used herein encompasses all the patterns that form diffraction grating surface patterns, e.g., striped and concentric circular patterns. The adhesive 4 is then filled in until it forms a layer covering the obliquely deposited film as at (E). Lastly, the substrate 19 is fitted onto the adhesive layer. While the process has been described as forming two vapor-deposited films 20 and 21, either film alone will do and even three or more films may be formed instead as a multilayer film. An additional dielectric film or films may be formed on the upper surface of the obliquely deposited film, inner side of the substrate 1, outer side of the substrate 19, etc.

The optical elements to be equipped with polarizers in conformity with the invention are, e.g., lenses, prisms, glass plates, magneto-optic elements, electro-optic elements, beam splitters, beam expanders, and optical fibers. The optical elements are not specifically confined to these but may, in general, be whatever elements which utilize polarizers. The magneto-optic elements include, but not limited to, YIG and Bi-substituted rare earth iron garnets, and the electro-optic elements include, but not limited to, PLZT, $LiNbO_3$ and the like. Magneto-optic optical parts using these magneto-optic elements equipped with the polarizers of the present invention also are covered by the invention. Examples of such magneto-optic optical parts are optical isolators, optical circulators, optical switches, photomagnetic-field sensors, and optical modulators. Examples of the products using the electro-optic elements are optical switches and optical modulators. These products too come within the scope of the present invention.

With the optical elements equipped with the polarizers of the invention, the grating pattern that functions as a polarizer may be formed on either plane of light incidence or emergence of the optical elements. The polarizer may be deposited, e.g., by oblique deposition so that it can converge the diffracted rays of light at a desired point. The optical elements thus equipped with the polarizers are not specifically limited as to the remainder of the element body. For example, an optical isolator may use any of various types of conventional Faraday rotators or magnetic field application means.

The polarizer fabricated in the manner described above may be employed in place of an ordinary polarizer or analyzer as a component of an optical device. In an optical head for an opto-magnetic disk, e.g., it may be disposed between the returning beam from the optical disk and the sensor to serve as an analyzer for differential signal detection of the opto-magnetic disk head.

The present invention is illustrated by the following examples which are not limitative.

EXAMPLES

EXAMPLE 1

Manufacture of a polarizer

Figure 4:
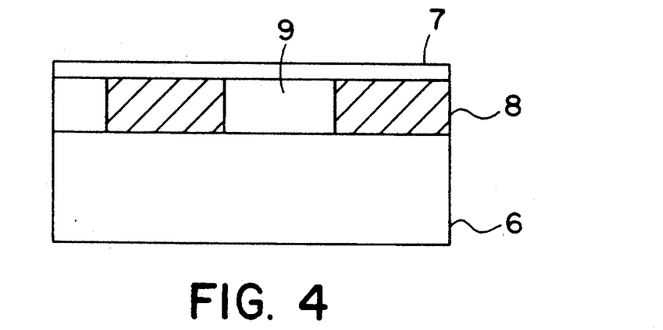
FIG. 4 is a cross sectional view of a polarizer made in Example 1 of the invention.

A polarizer for the light beam of a wavelength of 800 nm was designed and fabricated in the following manner. Films were formed on a substrate so that, in the above formulas (I) and (II), the numbers of layers in the first and second zones, the film compositions of the individual layers, refractive indexes, and layer thicknesses conformed to the values and film compositions given in Table 1. Referring to the table, the layers of low i and j values were on the substrate side. First, a glass substrate was made ready for processing, and a $Ta_2O_5$ film was formed on it by oblique deposition at an deposition angle of 70°. Zones 10 were masked in stripes 50 μm wide and the $Ta_2O_5$ film portions of zones 11 were removed by etching 50 μm wide. Next, $Y_2O_3$ was deposited by vapor deposition on the surface as masked, and then the mask was removed. Onto this unmasked surface was laminated a 150 nm-thick $MgF_2$ layer. Thus, a polarizer of the structure shown in FIG. 4 was obtained. The polarizer, upon passage of a light beam of $\lambda = 800$ nm, showed an extinction ratio of 18 dB.

TABLE 1

| | Zone 1 | | | | | Zone 2 | | | |
|---|---|---|---|---|---|---|---|---|---|
| i | Film compn | $n_{1+}$ | $n_{1-}$ | $d_{1i}$ | j | Film compn | $n_{2j+}$ | $n_{2j-}$ | $d_{2j}$ |
| 1 | $Ta_2O_5$ | 1.8 | 1.75 | 8000 nm | 1 | $Y_2O_3$ | 1.8 | 1.8 | 8000 nm |
| 2 | $MgF_2$ | 1.35 | 1.35 | 150 nm | 2 | $MgF_2$ | 1.35 | 1.35 | 150 nm |

EXAMPLE 2

Manufacture of an optical isolator by the formation of a polarizer on a Faraday rotator Following the sequence of steps (A) to (E) of FIG. 2, a laminate of films was formed, as comprising an obliquely vapor deposited film of $Ta_2O_5$ with a thickness of $d_1 = 8$ μm and a dielectric film of $SiO_2$ with a thickness of $d_2 = 7$ μm. The conditions of oblique deposition were such that the deposition angle was 70° and a $Ta_2O_5$ film of bilayered structure was formed. The periodicity of the gratings to be formed was 100 μm. A bismuth-substituted rare earth iron garnet film formed by the liquid-phase epitaxy (LPE) technique using a Faraday rotation angle of 45° was used. On the unlaminated side of the Faraday rotator was disposed an ordinary polarizer, at an angle of 45° to the angle of polarization of the polarizer that resulted from the lamination. When a beam of light with $\lambda = 780$ nm was incident upon it, the optical system thus obtained achieved an isolation of 15 dB, proving that it would function effectively as an optical isolator. Forming such a polarizer film on both sides of the Faraday rotator rather than on either side produces an optical isolator free from any ordinary polarizer, with the consequence that an extremely thin optical system is obtained.

EXAMPLE 3

Manufacture of an optical isolator by the formation of a polarizer on a Faraday rotator A polarizer for the light beam of a wavelength of 800 nm was designed and fabricated as follows. As a Faraday rotator, a Bi-substituted rare earth iron garnet was used. A polarizer in the form of films were formed on the garnet so that, in the above formulas (I) and (II), the numbers of layers in the first and second zones, the film compositions of the individual layers, refractive indexes, and layer thicknesses conformed to the values and film compositions given in Table 2. Referring to the table, the layers of low i and j values were on the substrate side. First, a Bi-substituted rare earth iron garnet (refractive index = 2.4) substrate was furnished, and a $SiO_2$ layer was formed up to the thickness given in Table 2 by vapor deposition on the substrate. A 50 nm-thick layer of $TiO_2$ was formed on it again by vapor deposition. The resulting double-layer film was intended to serve as a reflection-preventive film between the substrate and the next overlying layer. Then, a $Ta_2O_5$ film was formed on it by oblique deposition at a deposition angle of 70°. Zones 1 were masked in stripes 50 μm wide, and the $Ta_2O_5$ film portions of zones 2 were removed by etching 50 μm wide. Next, $Y_2O_3$ was deposited by vapor deposition on the surface as masked, and then the mask was removed. Onto this third layer were laminated by vapor deposition a $TiO_2$ layer and then an $SiO_2$ layer up to the thicknesses of 30 nm and 160 nm, respectively. These two layers were to serve as an antireflective film between the third layer and the atmospheric air.

TABLE 2

| i | Film compn | $n_{1i+}$ | $n_{1i-}$ | $d_{1i}$ | j | Film compn | $n_{2i+}$ | $n_{2i-}$ | $d_{2i}$ |
|---|---|---|---|---|---|---|---|---|---|
| 1 | $SiO_2$ | 1.45 | 1.45 | 20 nm | 1 | $SiO_2$ | 1.45 | 1.45 | 20 nm |
| 2 | $TiO_2$ | 2.2 | 2.2 | 50 | 2 | $TiO_2$ | 2.2 | 2.2 | 50 |
| 3 | $Ta_2O_5$ | 1.8 | 1.75 | 8000 | 3 | $Y_2O_3$ | 1.8 | 1.8 | 8000 |
| 4 | $TiO_2$ | 2.2 | 2.2 | 30 | 4 | $TiO_2$ | 2.2 | 2.2 | 30 |
| 5 | $SiO_2$ | 1.45 | 1.45 | 160 | 5 | $SiO_2$ | 1.45 | 1.45 | 160 |

Figure 5:
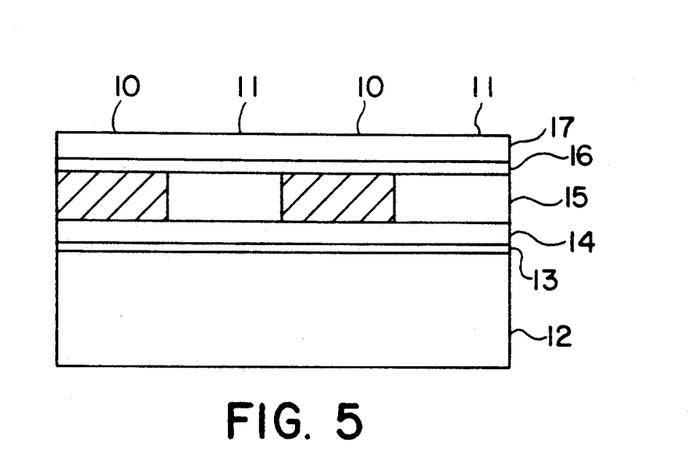
FIG. 5 is a cross sectional view of a Faraday rotator equipped with a polarizer, made in Example 3 of the invention.
Figure 6A:
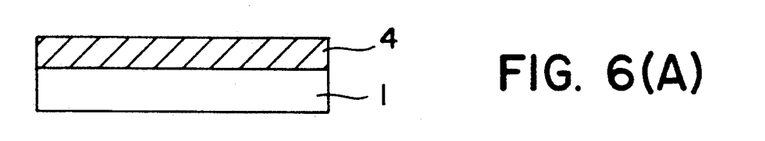
FIGS. 6(A) to 6(E) shows in a sequence of steps the process of producing a polarizer of an adhesive-filled type or a Faraday rotator equipped with the polarizer according to the invention.
Figure 6B:
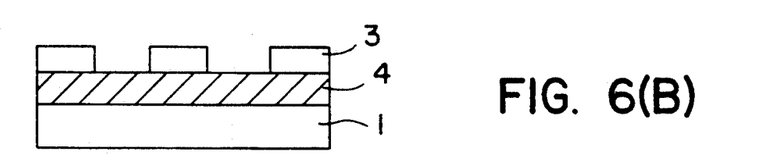
Figure 6C:
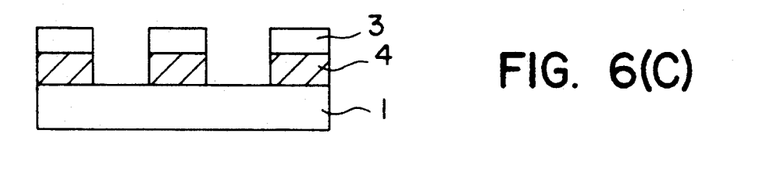
Figure 6D:
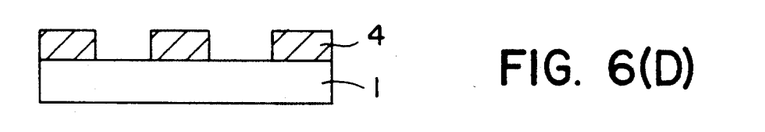
Figure 6E:
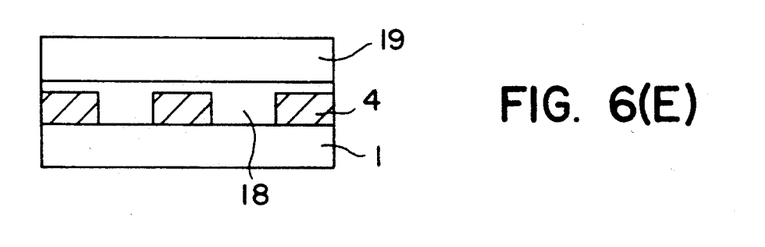
Figure 7A:
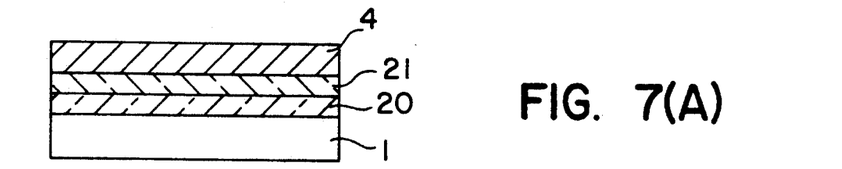
FIGS. 7(A) to 7(E) shows in a sequence of steps the process of producing a polarizer of a modified adhesive-filled type or a Faraday rotator equipped with the polarizer according to the invention.
Figure 7B:
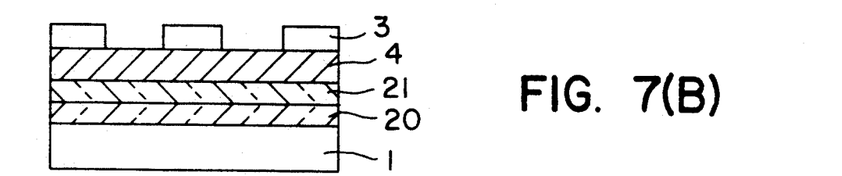
Figure 7C:
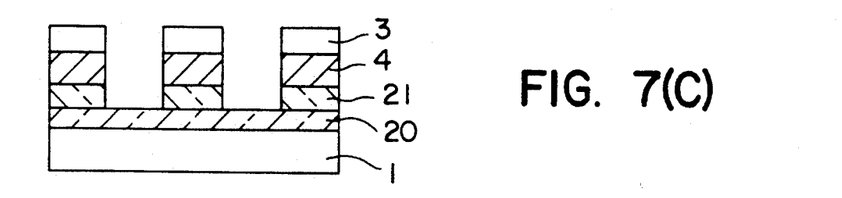
Figure 7D:
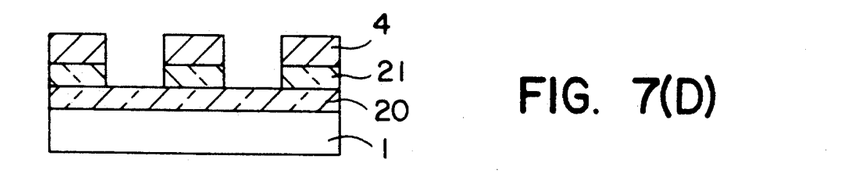
Figure 7E:
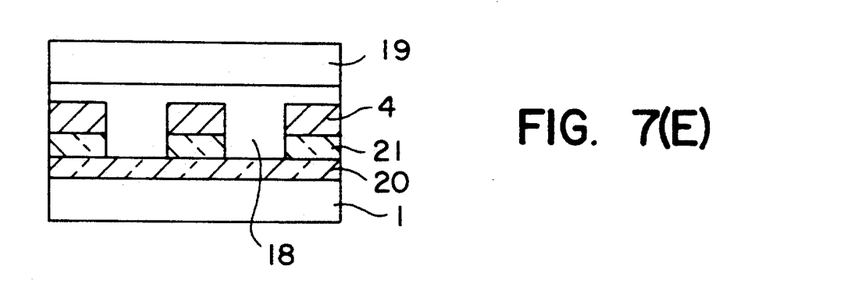

Thus, a Faraday rotator directly equipped with a polarizer on one side as shown in FIG. 5 was obtained. A conventional polarizer was provided on the opposite side of the Faraday rotator to complete an optical isolator. This optical isolator achieved an isolation of 17 dB, indicating that it would function effectively as an optical isolator. While the embodiment being described used a conventional polarizer on one side of the substrate, laminating the polarizer film onto the both sides instead will permit the fabrication of an even smaller optical isolator. The light beam to be polarized is not limited to that which has the wavelength of 800 nm; light beams of other wavelength ranges such as visible wavelength beams and those of 1300–1600 nm for optical communication may be used as well. Also, while the film thicknesses for the zones 10 and 11 in the above embodiment were the same, they may be different from each other provided they satisfy the formulas (I) and (II) above.

EXAMPLE 4

A polarizer according to the invention was made using a method which involves introduction of an adhesive as illustrated in FIG. 6. The polarizer was designed and fabricated for use with a light beam having a wavelength of 1300 nm in the following manner. Over a substrate, films were formed so that, in the above formulas (I) and (II), the numbers of layers in the first and second zones, the film compositions of the individual layers, refractive indexes, and layer thicknesses conformed to the values and film compositions given in Table 3. Two pieces of glass plate were prepared, one as the substrate 1 and the other as an additional substrate 19 to be referred to later. An obliquely deposited film 4 of $Ta_2O_5$ at a deposition angle of 70° was formed on the glass plate substrate 1. Next, as shown at (B), the film was masked 3 at a grating periodicity of 100 μm. The workpiece was then etched to remove unmasked film portions, forming grooves bottomed on the substrate 1. After the masks were dissolved away with a solvent, a thermosetting epoxy resin was filled in the grooves until it covered the obliquely deposited layer as at (E). Finally, the other glass substrate 19 was affixed to the adhesive layer 18.

TABLE 3

| i | Film compn | $n_{1i+}$ | $n_{1i-}$ | $d_{1i}$ | j | Film compn | $n_{2i+}$ | $n_{2i-}$ | $d_{2i}$ |
|---|---|---|---|---|---|---|---|---|---|
| 1 | Ta$_2$O$_5$ | 1.74 | 1.69 | 13000 nm | 1 | Adhesive | 1.54 | 1.54 | 13000 nm |

A test conducted with this polarizer to ascertain its extinction ratio showed that it exhibited an extinction ratio characteristic of 25 dB with respect to an incident light beam of $\lambda = 1300$ nm.

The polarizers according to the invention lend themselves excellently for mass production because they can be made in a simple way such as by oblique deposition, without the need of processing any special, expensive birefringent material as is the case with ordinary polarization prisms. They can be formed by oblique deposition directly on the planes of light beam incidence or emergence of various optical elements. The oblique deposition permits more precisely controlled formation of gratings than does the proton exchange technique. The optical elements with the polarizers formed by deposition give extremely thin optical systems, because they require no separate polarizer such as polarization prism. For example, optical isolators only hundreds of microns thick can be produced. This means that the present invention offers the advantage of reducing the size and space requirements of those optical elements. Moreover, direct formation by evaporation of the polarizers on lenses in accordance with the invention makes possible the realization of optical elements with more diverse functions than heretofore.

The present invention has so far been described in connection with optical isolators as optical elements on which the polarizers of the invention are formed by vapor deposition. The invention is not limited thereto, however; it is applicable to various other optical elements which use the polarizers of the invention, and further to the end products incorporating those optical elements.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A polarizer comprising first zones which are formed by one or more layers and second zones which are formed by one or more layers, said first and second zones being arranged alternately and horizontally on a common plane so as to form a diffraction grating structure, said second zones having a different optical character from that of said first zones, the material of at least one layer of said first zones being birefringent, said birefringent layer or layers being formed by oblique deposition, an adhesive being filled up on said second zones till it covers the top surface of said first zones, and a substrate affixed to said adhesive layer.

2. An optical element equipped with a polarizer according to claim 1, the polarizer being directly attached by oblique deposition to at least one plane of an optical element for incidence, emergence, or reflection of light rays.

3. An optical element equipped with a polarizer according to claim 2 wherein the optical element is selected from the group consisting of lenses, prisms, glass plates, magneto-optic elements, electro-optic elements, beam splitters, beam expanders, and optical fibers.

4. A magneto-optic element wherein a polarizer according to claim 1 is formed on at least one plane of a magneto-optic element for incidence, emergence, or reflection of light rays.

5. A magneto-optic element according to claim 4 which is selected from the group consisting of optical isolators, circulators, switches, photomagnetic sensors, and modulators.

6. An optical isolator according to claim 5 which contains a Ta$_2$O$_5$ layer as a birefringent layer in at least one zone thereof.

7. A head for opto-magnetic disk having a polarizer according to claim 1 formed on a glass element and which is used as an analyzer.

8. An optical switch or modulator having a polarizer according to claim 1 formed on at least one plane of an electro-optic element for incidence, emergence, or reflection of light rays.

9. A method of manufacturing a polarizer having a diffraction grating structure, which process comprises forming a birefringent film of a metallic oxide by vapor deposition on a substrate located obliquely with respect to the source of vapor deposition, depositing a masking material in a lattice pattern on the birefringent film, forming grooves in a lattice pattern in the birefringent film by etching, depositing an isotropic dielectric film on either the birefringent film or the substrate and also on the mask, and then removing the mask together with the dielectric film thereon.

10. A method of manufacturing an optical element equipped with a polarizer having a diffraction grating structure deposited on at least one plane of the optical element for incidence or emergence of light rays, which process comprises forming a birefringent film of a metallic oxide by vapor deposition on at least one plane of the optical element for light incidence or emergence located obliquely with respect to the source of vapor deposition, depositing a masking material in a lattice pattern on the birefringent film, forming grooves in a lattice pattern in the birefringent film by etching, depositing an isotropic dielectric film on either the birefringent film or the substrate and also on the mask, and then removing the mask together with the dielectric film thereon.

11. A method of manufacturing an optical isolator equipped with a polarizer having a diffraction grating structure deposited on at least one plane of a Faraday rotator for incidence or emergence of light rays, which process comprises forming a birefringent film of a metallic oxide by vapor deposition on at least one plane of the Faraday rotator having a rotation angle of 45° for light incidence or emergence located obliquely with respect to the source of vapor deposition, depositing a masking material in a lattice pattern on the birefringent film, forming grooves in a lattice pattern in the birefringent film by etching, depositing an isotropic dielectric film on either the birefringent film or the substrate and also on the mask, and then removing the mask together with the dielectric film thereon.

12. A method of manufacturing a polarizer having a diffraction grating structure, which process comprises forming a birefringent film of a metallic oxide by vapor deposition on a substrate located obliquely with respect to the source of vapor deposition, depositing a masking material in a lattice pattern on the birefringent film, forming grooves in a lattice pattern in the birefringent film by etching, and, before or after the removal of the mask, filling up the grooves with a filler.

13. A method of manufacturing an optical element equipped with a polarizer having a diffraction grating structure deposited on at least one plane of the optical element for incidence or emergence of light rays, which process comprises forming a birefringent film of a metallic oxide by vapor deposition on at least one plane of the optical element for light incidence or emergence located obliquely with respect to the source of vapor deposition, depositing a masking material in a lattice pattern on the birefringent film, forming grooves in a lattice pattern in the birefringent film by etching, and before or after the removal of the mask, filling up the grooves with a filler.

14. A method of manufacturing an optical isolator equipped with a polarizer having a diffraction grating structure deposited on at least one plane of a Faraday rotator for incidence or emergence of light rays, which process comprises forming a birefringent film of a metallic oxide by vapor deposition on at least one plane of the Faraday rotator having a rotation angle of 45° for light incidence or emergence located obliquely with respect to the source of vapor deposition, depositing a masking material in a lattice pattern on the birefringent film, forming grooves in a lattice pattern in the birefringent film by etching, and, before or after the removal of the mask, filling up the grooves with a filler.

15. A method according to any one of claims 12 to 14 wherein the filler is an adhesive and the filler is filled up so as to cover the top of the birefringent film too and then an additional substrate is affixed onto the filler layer.

16. A method according to claim 15 wherein at least one type of dielectric film is formed, prior to the formation of the birefringent film, on the substrate.

17. A method according to any one of claims 9 to 14 wherein at least one type of dielectric film is formed, prior to the formation of the birefringent film, on the substrate.

* * * * *